(12) United States Patent
Wadia

(10) Patent No.: US 8,866,793 B2
(45) Date of Patent: Oct. 21, 2014

(54) CAPACITIVE TOUCH SCREEN HAVING DYNAMIC CAPACITANCE CONTROL AND IMPROVED TOUCH-SENSING

(75) Inventor: Bahar N. Wadia, Glendale Heights, IL (US)

(73) Assignee: UICO, Inc., Elmhurst, IL (US)

( * ) Notice: Subject to any disclaimer, the term of this patent is extended or adjusted under 35 U.S.C. 154(b) by 136 days.

(21) Appl. No.: 13/220,445

(22) Filed: Aug. 29, 2011

(65) Prior Publication Data

US 2012/0092288 A1 Apr. 19, 2012

Related U.S. Application Data

(60) Provisional application No. 61/377,837, filed on Aug. 27, 2010.

(51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01)
USPC ....................................................... 345/174

(58) Field of Classification Search
CPC ........ G06F 3/044; G06F 3/0418; G06F 3/041; G06F 2203/04107; G01D 5/24; H03K 17/955; H03K 17/96; H03K 17/962; H03K 2217/0027; H03K 2217/9607; H03K 2217/96076
USPC ...................... 345/173–174; 178/18.01–20.04
See application file for complete search history.

(56) References Cited

U.S. PATENT DOCUMENTS

| 5,455,574 | A | 10/1995 | Itaya et al. |
| 5,457,289 | A * | 10/1995 | Huang et al. ............... 178/18.08 |
| 7,453,444 | B2 | 11/2008 | Geaghan |
| 8,390,361 | B2 | 3/2013 | Ningrat |
| 8,395,599 | B2 | 3/2013 | Souchkov |
| 2003/0067451 | A1* | 4/2003 | Tagg et al. .................... 345/174 |
| 2007/0074913 | A1* | 4/2007 | Geaghan et al. ........... 178/18.06 |
| 2008/0136792 | A1* | 6/2008 | Peng et al. .................... 345/174 |
| 2009/0244030 | A1 | 10/2009 | Kimura et al. |
| 2010/0013788 | A1 | 1/2010 | Park et al. |

(Continued)

OTHER PUBLICATIONS

Mark Lee, *Build a Touch-Sensor Solution for Wet Environments*, Oct. 23, 2008, 7 Pgs.

(Continued)

*Primary Examiner* — Dwayne Bost
*Assistant Examiner* — Ivelisse Martinez Quiles
(74) *Attorney, Agent, or Firm* — Brinks Gilson & Lione

(57) ABSTRACT

Methods and apparatus for improving the sensing performance of a capacitive touch screen sensing device. The electrical potential of conductive structures proximate capacitive touch pads of the sensing device is altered to compensate for the effect of parasitic capacitance, based on external conditions such as water on the touch screen or an intervening user worn glove. The compensation for parasitic capacitance improves the signal to noise ratio and therefore the sensing performance of the device.

20 Claims, 3 Drawing Sheets

(56) References Cited

U.S. PATENT DOCUMENTS

| | | |
|---|---|---|
| 2010/0085322 A1 | 4/2010 | Mamba et al. |
| 2010/0315363 A1* | 12/2010 | Kobayashi et al. ............ 345/173 |
| 2011/0068810 A1 | 3/2011 | Yeates et al. |
| 2011/0115742 A1* | 5/2011 | Sobel et al. .................... 345/174 |
| 2011/0261005 A1* | 10/2011 | Joharapurkar et al. ........ 345/174 |
| 2012/0026123 A1* | 2/2012 | Grunthaner et al. ........... 345/174 |
| 2012/0050214 A1* | 3/2012 | Kremin et al. ................. 345/174 |
| 2012/0113047 A1 | 5/2012 | Hanauer et al. |
| 2013/0038338 A1 | 2/2013 | Lipasti et al. |
| 2013/0038566 A1 | 2/2013 | Singh et al. |
| 2013/0063157 A1 | 3/2013 | La Rosa |

OTHER PUBLICATIONS

Transmittal of the International Search Report and Written Opinion; International Search Report; and Written Opinion, cited in PCT International Application No. PCT/US2011/04950, Mailed May 1, 2012.

Osoinach, Bryce; "Proximity Capacitive Sensor Technology for Touch Sensing Applications;" 2008; 12 pages; Freescale Semiconductor, Inc.; Tempe, AZ; printed from the internet Apr. 18, 2013 @ http://www.freescale.com/files/sensors/doc/white_paper/PROXIMITY.pdf.

Examiner's Report issued in Canadian patent application No. 2,807,387, Feb. 20, 2014, 6 pages.

* cited by examiner

CAPACITIVE TOUCH SCREEN HAVING DYNAMIC CAPACITANCE CONTROL AND IMPROVED TOUCH-SENSING

RELATED APPLICATIONS

This application claims the benefit of U.S. Provisional Patent Application No. 61/377,837, filed Aug. 27, 2010, and entitled CAPACITIVE TOUCH SCREEN HAVING DYNAMIC CAPACITANCE CONTROL AND IMPROVED TOUCH-SENSING, said application being hereby fully incorporated herein by reference.

FIELD OF THE INVENTION

The invention relates to capacitive touch sensing technologies. More specifically, the invention relates to capacitive touch sensing screens such as those used in mobile phones and other digital appliances.

BACKGROUND OF THE INVENTION

Touch screens are electronic visual displays that can detect the presence and location of a touch on the surface of the display area. Touching of the display is generally done with a finger or hand. Touch screens operate under a variety of electronic, acoustic or optical principals. This application is concerned with capacitive touch screens.

Capacitive touch screen panels generally include an insulator, such as glass, coated with a transparent conductor, such as copper or indium tin oxide (ITO). Because the human body is also a conductor, touching the touch screen results in a measurable change in capacitance. The change in capacitance caused by the touch is localized and registered to a particular location on the touch screen.

Capacitive touch sensing technologies including discrete touch pads and multi-touch screens have recently gained great acceptance in products ranging from cell phones to large display monitors. Many believe the success of these technologies is a direct result of the improved user interaction as experienced by the users.

One benefit of using a solid state touch sensing technology is its virtually unlimited life. Unlike mechanical alternatives which have moving components that wear with time in repeated use, a solid state touch sensing screen has no such limitation. Solid state touch sensing screens rarely fail and users worry little about a broken user interface. Capacitive touch sensors can be integrated underneath a single solid sealed surface, such as glass or molded plastic, which makes the sensitive components inside the product separated from and largely immune from the outside environment. This is very difficult and costly to achieve with mechanical alternatives. Thus, capacitive touch screen technologies provide great benefits for products that are used in harsh outdoor environments, industrial facilities and other locations that are subject to dirt and moisture.

In a typical implementation of a capacitive touch sensing device, the target touch sensing pad, which is typically a square, rectangular or circular area of copper or indium tin oxide (ITO) on a carrier such as glass reinforced epoxy laminate (FR4), printed circuit board (PCB) or polyethylene terephthalate. (PET). The target touch sensing pad is actively charged then permitted to passively discharge at a rate which is proportional to its natural capacitance. The rate of discharge of the target touch sensing pad is measured using one of several well known methods. When a finger or other conductive appendage is placed over the touch sensing pad, the presence of the finger increases the capacitance of that pad by adding to the pad's natural capacitance. In this state, the touch sensing pad is able to hold more charge and as a result takes longer to discharge. By measuring the difference in the time it takes to discharge a particular touch sensing pad in the two states, one can determine if the pad is being touched or not.

The amount of increase in capacitance when a finger is placed against the touch sensing pad varies dependent upon the design and construction of the touch sensing pad. The greater the capacitive coupling between the finger and the touch sensing pad, the greater the change in capacitance. Conversely, the less the coupling between the finger and the touch sensing pad the less the change in capacitance due to the touch. Higher changes in capacitance when the touch sensing pad is touched yield a higher signal to noise ratio (SNR) which translates to better performance of the touch sensing pad. The proportion of increase in capacitance of the touch sensing pad when it is touched by a finger is a function of the natural capacitance of the pad and the added capacitance provided by the presence of the finger. Accordingly, if the pad has low natural capacitance coupled with a better coupling to a human finger, better sensitively and performance to touch will be demonstrated.

The natural capacitance of a touch sensing pad is determined by several factors. The choice of materials used in construction of the pad including but not limited to the material of the carrier (which is the dielectric substrate to which the conductive sensor is attached), the protective substrate (which is the surface behind which the sensor is protected) and the conductors. The placement of other conductors around the touch sensing pad and the electrical potential on those conductors also affects the natural capacitance of the touch sensing pad. The coupling between the conductor and the protective substrate also affects the natural capacitance of the touch sensing pad. There are many other factors and this list should not be considered to be exhaustive. Accordingly, the approach of seeking lower natural capacitance with better coupling to a human finger inherently fixes and affects the natural capacitance of the touch sensing pad. This also limits the ability to affect the SNR without completely altering the construction of the sensor. Altering the construction of the sensor is difficult and expensive and can even be impossible. The presence of these limitations tends to lead to poorly performing or very expensive solutions. Accordingly, there is room for the improvement in the area of capacitance touch sensing screens.

SUMMARY OF THE INVENTION

Embodiments of the present invention involve the selective manipulation of electrical potential, and accordingly, the effect of capacitance associated with structures in and around a touch screen or elements of the touch screen such as the sensing pads. Embodiments of the present invention may include the use of electrically manipulated conductive surfaces (EMCS). In one embodiment of the invention, EMCS are strategically placed conductive surfaces that can be electrically manipulated by, for example, controlling their electrical potential or charge. EMCS can be purposely applied to affect the capacitance of the touch sensing pad by changing the electrical potential of the EMCS in ways that affect the sensitivity and performance of that touch sensing pad.

In another embodiment of the invention, EMCS can be implemented as other touch sensing pads that can be electrically manipulated. When this is done, time multiplexing of a plurality of touch sensing pads as sensors or EMCS yields similar results and allows precise tuning of the natural capacitance of each touch sensing pad. Each conductive pad is charged and monitored for rate of discharge in a predetermined sequence as touch is sensed. Inactive pads that are not being used for touch sensing and that are adjacent to the active sensing pad can be used as EMCS by controlling their charge level relative to the active sensing pad. Effective use of EMCS enables the ability to adjust the relative charge and capacitance of the touch sensing pads dynamically and to optimize it for desired performance.

A typical capacitive touch screen includes a substrate on which an adhesive is applied, a touch pad made from a printed circuit board (PCB) is then adhered to the substrate with the adhesive. Traces, other conductors, a processor, and other electrical components may be formed on, or attached to, the PCB.

Parasitic capacitance is the unavoidable and usually unwanted capacitance that exists between the parts of an electronic component or circuit simply because of the proximity of conductive parts to each other. All actual circuit elements such as inductors, diodes and transistors have internal capacitance which can cause their actual behavior to depart from that of ideal circuit elements. Parasitic capacitance can also exist between closely spaced conductors such as wires or printed circuit board traces.

A typical touch pad may have a natural capacitance of approximately ten picofarads (pf). Adjacent traces on the printed circuit board, other conductive artifacts and the protective substrate, among other things, add parasitic capacitance. The additional parasitic capacitance results in a net increase of the overall capacitance of a touch pad beyond the natural capacitance of the touch pad alone. This concept is depicted in FIG. 3. The increase in overall capacitance caused by parasitic capacitance can range from a few picofarads (pf) to any practical upper limit.

A typical example touch pad that is a part of a touch screen may, for example, be structured as a disk 14 mm in diameter. At this size, the typical human finger can completely cover the surface area of the touch pad when the finger is placed on the top of the touch pad. This helps to maximize capacitive coupling between the finger and the touch pad and generates a high signal to noise ratio. The increase in capacitance resulting from the presence of the finger on the touch pad can be as much as approximately five pf. Dependent upon the influence of parasitic capacitance on the touch pad, such a five pf addition in capacitance caused by the presence of the finger over the touch pad can result in an increase overall capacitance of 50 percent, assuming a natural capacitance of 10 pf. If the magnitude of added parasitic capacitance is high, however, the overall capacitance will be increased by significantly less than 50 percent. If the parasitic capacitance is exceptionally high, the percentage increase in capacitance created by placement of the finger over the touch pad can approach zero, in which case, the presence of a finger touch cannot be detected. Such a large increase in parasitic capacitance can result from, for example, the presence of water or other conductive substances on the surface of the touch screen pad.

An example touch screen pad in accordance with the invention, which includes EMCS, is depicted in FIG. 4. In this example embodiment, the EMCS disposed around the various touch screen pads is coupled to electronics by which the electrical potential, and thereby the effective capacitance between the EMCS and the touch screen pad can be manipulated. By adjusting the potential on the EMCS, the alteration of the natural capacitance of the touch pad by the presence of a finger can be manipulated to increase or decrease the effect that the presence of the finger has when coupling to the touch pad.

For example, if the natural capacitance of the touch pad is approximately 10 pf and the parasitic capacitance adds another 10 pf, the presence of the finger over the touch pad adds an additional 5 pf, then the change due to the presence of the finger is an increase of 25%. In accordance with the invention, however, EMCS are used to reduce or compensate for the parasitic capacitance. When the parasitic capacitance is reduced and if the natural capacitance and the added capacitance of the presence of the finger remain the same, there is a net increase in the percentage effect of the finger as compared to the sum of the natural capacitance in the parasitic capacitance, hence, a larger signal to noise ratio (SNR) which leads to better sensing and greater design flexibility in accordance with the invention.

According to embodiments of the invention, changes in the effective amount of parasitic capacitance affecting sensing function on a touch screen can be altered strategically. For example, the amount of net total capacitance (natural capacitance plus parasitic capacitance) affecting the sensing function can be uniformly altered according to expected conditions. For example, if it is expected that water might be present on the screen, the electrical potential of the touch sensing elements and the other components that might induce parasitic capacitance can be equalized, such that the change in overall net capacitance induced by the presence of a layer of water on the screen is reduced or virtually eliminated. In such cases where the additional capacitance induced by the water is reduced, the amount of capacitance change induced by the finger of a user touching the screen is relatively greater, thereby improving responsiveness and performance of the touch screen.

In other cases the amount of capacitance change induced by a user touch might be expected to be decreased from that which might be expected to be induced by close proximity of the user's finger with the touch sensor. For example, a glove worn by the user might result in the user's finger being disposed further from the touch sensor, thereby decreasing the amount of additional capacitance the user's finger adds to the system. In such cases, it is advantageous to increase the sensitivity of the touch screen by reducing the overall capacitance of the touch screen (natural plus parasitic capacitance) thereby increasing the relative amount of change induced by the user touch and easing detection.

Accordingly, an advantage of certain embodiments of the invention is that manipulation of effective capacitance enables greater touch screen design flexibility to account for known external conditions such as the presence of water on the touch screen or a user wearing thick gloves.

Another advantage of certain embodiments is a touch screen device with a higher signal to noise ratio, offering improved ability to detect small changes in capacitance due to a user touch.

Another advantage of certain embodiments is the ability to dynamically adjust sensing performance of the touch pad to compensate for design constraints or known external conditions.

According to an embodiment of the invention, a method of improving the sensing performance of a capacitive touch screen device including at least one capacitive touch pad element, the method includes selectively altering a magnitude of an electrical potential of at least one electrically conductive structure proximate the at least one capacitive touch pad element based on an electrical potential of the at least one capacitive touch pad element, to alter an effective capacitance of the at least one capacitive touch pad element, and subsequently detecting a user touch of the at least one capacitive touch pad element. In an embodiment, the electrical potential of the at least one electrically conductive structure is altered to substantially match the electrical potential of the at least one capacitive touch pad element. In an alternative embodiment, the electrical potential of the at least one electrically conductive structure is altered to a magnitude substantially different from the electrical potential of the at least one capacitive touch pad element. The method may further include disposing a plurality of electrically conductive elements proximate the at least one capacitive touch pad element. The electrical potential of each of the plurality of electrically conductive elements may be altered based on the electrical potential of the at least one capacitive touch pad element. In another embodiment, the capacitive touch screen may includes a plurality of capacitive touch pad elements, and a plurality of electrically conductive elements may be disposed proximate each capacitive touch pad element of the plurality. The at least one electrically conductive element may be another capacitive touch pad element disposed proximate the at least one capacitive touch pad element.

In other embodiments a capacitance touch sensing device includes a plurality of capacitive touch sensing pads operatively coupled with a processor for sensing a user touch, at least one electrically conductive element disposed proximate each one of the plurality of capacitive touch sensing pads, and apparatus for selectively altering a magnitude of an electrical potential of the conductive elements based on a magnitude of an electrical potential of the capacitive touch sensing pads and based on an expected external condition. The expected external condition may be the presence of water on the capacitive touch sensing device, and the electrical potential of the electrically conductive elements may be altered to substantially match the electrical potential of the capacitive touch sensing pads. In other embodiments, the expected external condition may be a user glove intervening between a user's finger and the capacitive touch sensing pads, and the electrical potential of the electrically conductive elements may be altered to substantially match the electrical potential of the capacitive touch sensing pads.

In an embodiment, the electrically conductive elements may be other capacitive touch pads of the plurality of capacitive touch pads. In other embodiments, the electrically conductive elements are conductive structures separate from the capacitive touch pads. The electrically conductive elements may be formed on a same substrate as the capacitive touch pads.

In another embodiment, a method of compensating for parasitic capacitance in a capacitive touch screen device including at least one capacitive touch pad element includes selectively altering a magnitude of an electrical potential of at least one electrically conductive structure proximate the at least one capacitive touch pad element based on an electrical potential of the at least one capacitive touch pad element, and subsequently detecting a user touch of the at least capacitive touch pad element.

In an embodiment, the electrical potential of the at least one electrically conductive structure is altered to substantially match the electrical potential of the at least one capacitive touch pad element. In another embodiment the electrical potential of the at least one electrically conductive structure is altered to a magnitude substantially different from the electrical potential of the at least one capacitive touch pad element. The method may further include disposing a plurality of electrically conductive elements proximate the at least one capacitive touch pad element. The electrical potential of each of the plurality of electrically conductive elements may be altered based on the electrical potential of the at least one capacitive touch pad element.

In another embodiment, the capacitive touch screen includes a plurality of capacitive touch pad elements, and a plurality of electrically conductive elements is disposed proximate each capacitive touch pad element of the plurality. The at least one electrically conductive element may be another capacitive touch pad element disposed proximate the at least one capacitive touch pad element.

BRIEF DESCRIPTION OF THE DRAWINGS

The embodiments of the present invention may be more completely understood in consideration of the following detailed description of various embodiments in connection with the accompanying drawings, in which.

Figure 1:
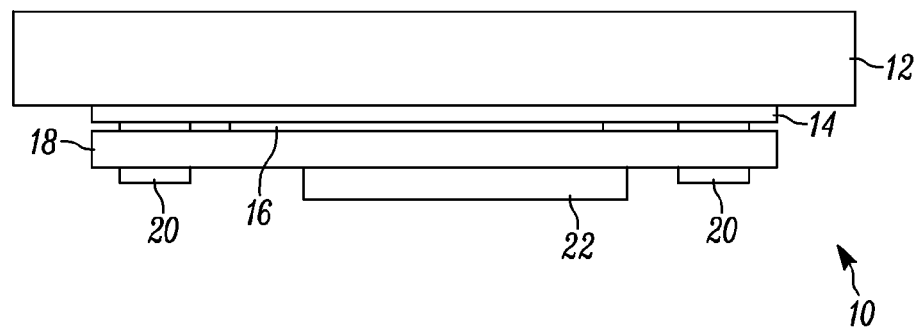
FIG. 1 is a schematic plan view of an example touch pad display according to an embodiment of the invention.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention as expressed in the appended claims.

DETAILED DESCRIPTION

Figure 2:
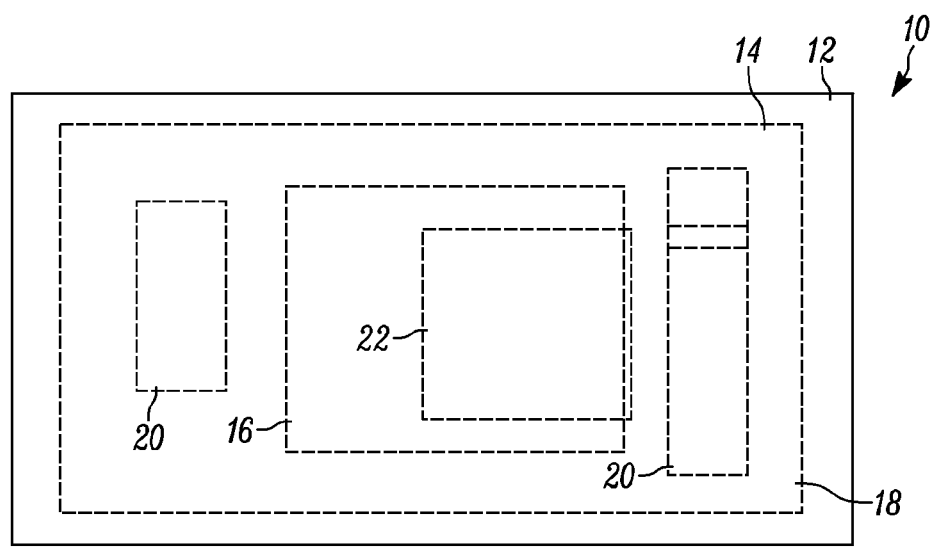
FIG. 2 is a schematic elevational view of the example touch pad display of FIG. 1.

Referring to FIGS. 1 and 2, capacitive touch sensing screen device 10 generally includes substrate 12, adhesive 14, touch sensing screen 16, PCB substrate 18, traces 20 and a controlling processor in the form of integrated circuit 22. Processor 22 or other electronic components are coupled to traces 20 to control and manipulate the charge on structures of capacitive touch sensing screen 10 as is known in the art.

Figure 3:
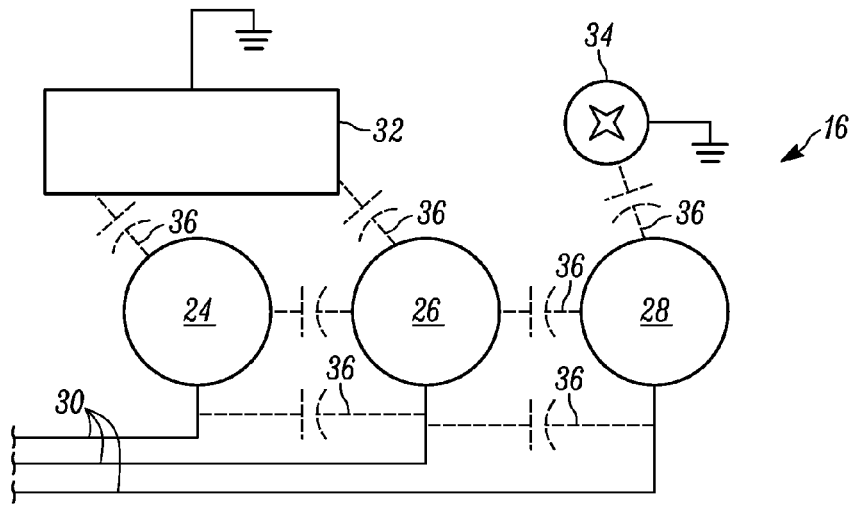
FIG. 3 is a schematic view of an example prior art touch pad display depicting the presence and effect of parasitic capacitance.

Referring now to FIG. 3, a typical prior art capacitive touch sensing screen 16 includes first touch pad 24, second touch pad 26, third touch pad 28, touch pad conductors 30 coupled to traces 20, metal bracket 32 and screw 34. Metal bracket 32 and screw 34 are generally at chassis ground potential. Parasitic capacitance 36 is depicted in FIG. 3. Parasitic capacitance 36 exists between various conductive parts of the circuit because of the proximity of conductive parts to each other. In FIG. 3, parasitic capacitance is depicted as existing between first touch pad 24, second touch pad 26 and third touch pad 28 as well as between first touch pad 24 and metal bracket 32 between third touch pad 28 and screw 34 and between conductors 30. Parasitic capacitance may also be added by other elements, such as other conductive artifacts, and the protective substrate itself.

In the prior art touch screen of FIG. 3, the magnitudes of the parasitic capacitances 36 are unpredictable. For example, the magnitude of any one of the parasitic capacitances 36 may range from zero up to 10 pf or more. Assuming a natural capacitance of the touch pads 24, 26, 28, of about 10 pf, the additive effect of the parasitic capacitance might make the net capacitance of the touch screen 10 as much as 20 pf or more. Assuming a finger touch adds another 5 pf, the total change in capacitance due to a finger touch would be only about 25% (5 pf/20 pf), or possibility even less. As such, the SNR is very low and the usable detectable range of change in capacitance is limited to about 25%. This loss of information limits the ability to sense fine changes in capacitance, such as for example, when the touch pad is used with gloves or when it is wet.

Figure 4:
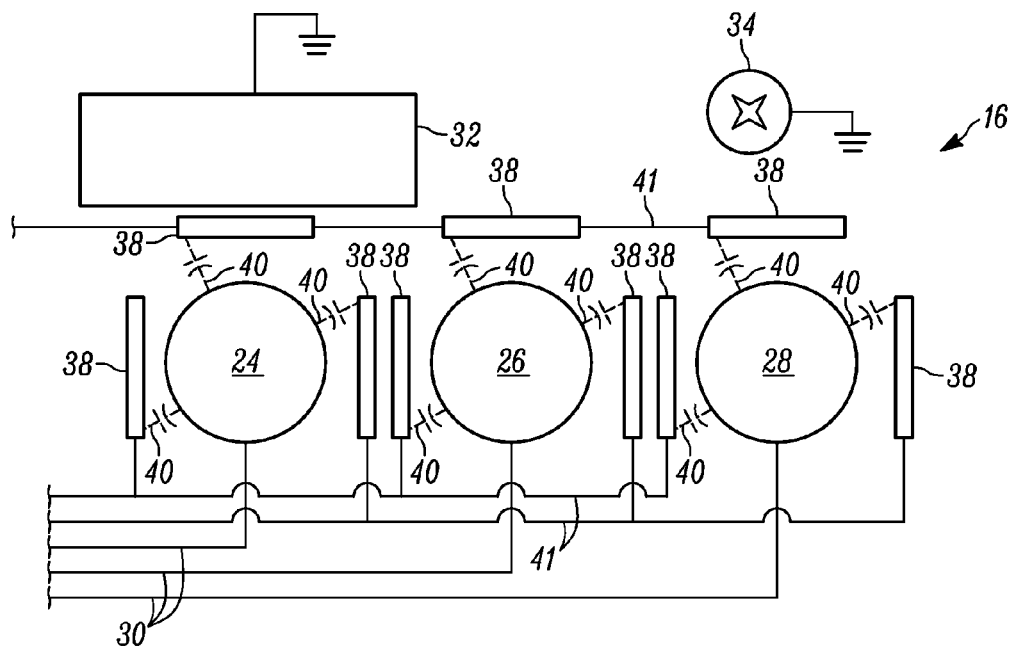
FIG. 4 is a schematic view of an exemplary touch pad display including electrically manipulated conductive surfaces according to an embodiment of the invention.
Figure 6:
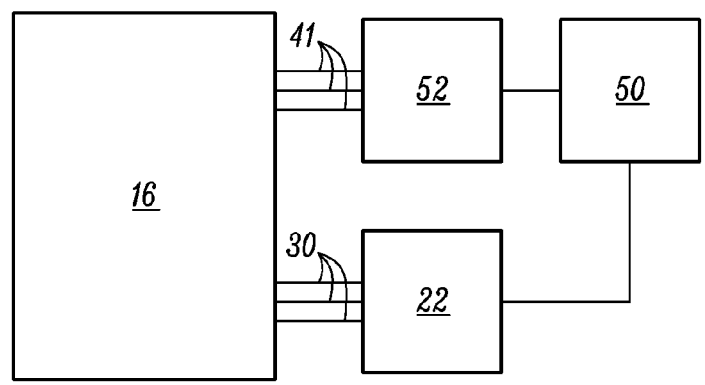
FIG. 6 is a block schematic diagram of a touch pad sensing device according to an embodiment of the invention.

Referring to FIGS. 4 and 6, a first example embodiment of the invention is depicted in which touch pad 16 includes including electrically manipulated conductive surfaces (EMCS) 38 according to an embodiment of the invention. EMCS elements 38 can be formed from the same material as touch pads 24, 26, 28, for example ITO, or can be any other suitable conductive material. EMCS elements 38 can be formed on the same substrate as the touch pads 24, 26, 28, or can be placed on a separate adjacent substrate. EMCS elements 38 are coupled through conductors 41 to electrical power supply 50 through potential adjustment apparatus 52. Potential adjustment apparatus 52 may be any suitable known circuitry capable of altering an output electrical potential applied to conductors 41 in response to a signal from processor 22. Alternatively, potential adjustment apparatus 52 may be omitted and conductors 41 may be coupled directly with processor 22, with processor 22 effecting the desired potential adjustments.

Manipulated capacitances 40 exist between EMCS 38 and first touch pad 24, second touch pad 26 and third touch pad 28 as depicted in FIG. 4. In accordance with embodiments of the invention, the electrical potential applied to EMCS 38 is manipulated and controlled relative to the electrical potential of first touch pad 24, second touch pad 26 and third touch pad 28, thereby manipulating the effective capacitive value of manipulated capacitances 40. Because the electrical potential applied to EMCS, and therefore the effective value of manipulated capacitances 40, is actively controlled, the sensitivity of first touch pad 24, second touch pad 26 and third touch pad 28 can be adjusted, and the effect of additional parasitic capacitances, for example, caused by water on the surface of touch capacitance sensing screen 10 can be mitigated or negated.

Referring now to FIG. 4, in a first example of a strategy for mitigating the effect of water on touch screen 10, EMCS elements 38 are set to the same electrical potential as first touch pad 24, second touch pad 26, and third touch pad 28. For instance, if first touch pad 24, second touch pad 26, and third touch pad 28, are operated with a +2.0 VDC potential, EMCS elements 38 are all charged at the same +2.0 VDC potential. Since there is no difference in potential between first touch pad 24, second touch pad 26, third touch pad 28, and EMCS elements 38, manipulated capacitances 40 are effectively set to zero. Hence, assuming each touch pad 24, 26, 28, has a natural capacitance of 10 pf, the reduction of any parasitic capacitance component to effectively zero makes the net capacitance of touch screen 10 essentially equal to the 10 pf natural capacitance of the touch pads 24, 26, 28. Any parasitic capacitance added by a layer of water on touch screen 10 will not affect sensing performance, since it adds capacitance equally to touch pads 24, 26, 28, and EMCS elements 38, and these are all at the same electrical potential. When a finger touch is made to any of touch pads 24, 26, 28, assuming the finger touch adds 5 pf, the touched pad will appear to have a total capacitance of 15 pf, a 50% increase from its natural capacitance of 10 pf. This effectively doubles the SNR from the prior art touch screen without EMCS, even when water is present on touch screen 10.

A similar strategy can be beneficial when compensating for the attenuation of capacitive coupling due to a user wearing gloves. The increased distance of a user's finger from the touch pad because of the thickness of a glove can result in a decreased magnitude of capacitive coupling between the user's finger and the touch pad. For example, a user's finger touch may result in only a 2 pf increase in net capacitance of the touch screen when the user is wearing a glove, as opposed to a 5 pf increase when the user touches the screen with a bare finger. In the case of the prior art touch pad of FIG. 3, wherein parasitic capacitances amounting to 10 pf add to the 10 pf natural capacitance of the touch pads 24, 26, 28, for a total capacitance of 20 pf, the change in capacitance of 2 pf would amount to only a 10% change—an amount of change difficult to distinguish from changes due to noise.

In the EMCS embodiment of FIG. 4, however, with the electrical potential of the EMCS elements 38 set to the same electrical potential as the touch pads 24, 26, 28, thereby eliminating the effect of parasitic capacitance, each touch pad 24, 26, 28, has an overall capacitance equal to its natural capacitance of 10 pf. In this case, the 2 pf change due to a user touch through a glove amounts to a 20% change in capacitance, which is much easier to distinguish from changes due to noise.

EMCS can also be beneficially employed in a case where the change in capacitance due to a user touch is actually too large to be effectively measured by the hardware associated with the touch screen. This causes signal clipping—or in other words loss of signal/information. By applying an appropriate potential to the EMCS elements 38, it becomes possible to limit the change due to touch while preserving signal integrity and stability. This makes it possible to reliably infer smaller changes due to the reduced gain and also makes it possible to apply capacitive sensing to a much broader set of products.

Referring again to FIG. 4 and assuming the same natural capacitance of touch pads 24, 26, 28, of 10 pf, the electrical potential of EMCS elements 38 can be set at one-half the electrical potential of touch pads 24, 26, 28. In an example embodiment, this can result in a manipulated capacitance 40 value of 5 pf, thereby establishing the overall net capacitance of touch pads 24, 26, 28, at 15 pf. If the added capacitance from a user touch is assumed to be 5 pf, then the result is a 25% change in capacitance, which may better accommodate the sensing range of a processor coupled to the touch pads 24, 26, 28.

In a further embodiment, these and other such beneficial strategies can be selectively employed dynamically in response to sensed conditions. For example, if a signal clipping condition is detected by the processor, the electrical potential of the EMCS elements 38 can be reduced by an algorithm programmed in the processor to a level where signal clipping no longer occurs, but that is still at a level high enough to negate the effects of parasitic capacitance, thereby optimizing the SNR of the touch screen.

Similarly, using known methods and apparatus for detecting the presence of water, an algorithm programmed in the processor can increase the electrical potential applied to EMCS elements 38 from a level where manipulated capacitances 40 are non-zero to a level equal to the potential of touch pads 24, 26, 28, so as to make manipulated capacitances 40 effectively zero. Hence, the effect of water on touch screen 10 can be effectively addressed dynamically when it occurs.

Figure 5:
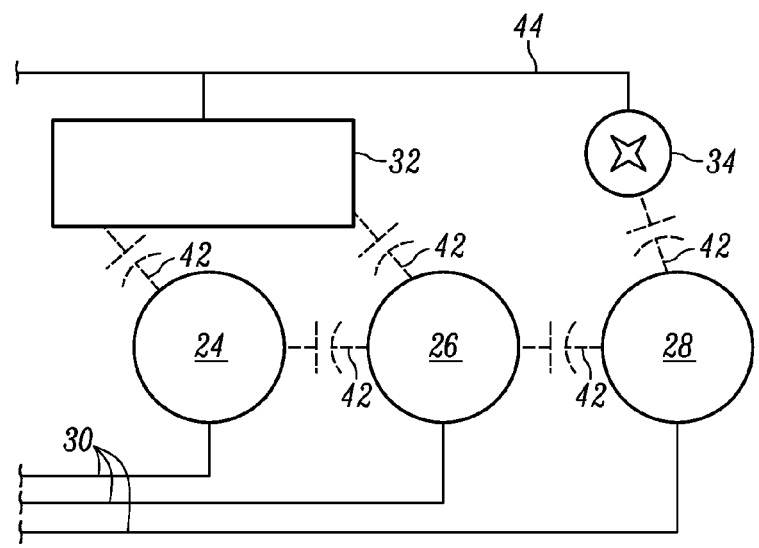
FIG. 5 is a schematic view of an exemplary touch pad display including electrically manipulated conductive surfaces according to an alternative embodiment of the invention.

In another embodiment of the invention depicted in FIG. 5, first touch pad 24, third touch pad 28, and adjacent conductive structures such as metal bracket 32 and screw 34 can act as EMCS elements, such that manipulated capacitances 42 are established. As each touch pad 24, 26, 28, is scanned in turn by the processor to detect capacitance change, the electrical potentials of the adjacent touch pads can be adjusted to a desired level, such as described above, so as to affect sensing performance. For example, when second touch pad 26 is active, the electrical potentials of first touch pad 24 and third touch pad 28 can be adjusted to affect the sensitivity of second touch pad 26. In a case where water is present on the screen for example, the potentials of first touch pad 24 and third touch pad 28 can be adjusted to match the potential of second touch pad 26, thereby making manipulated capacitance 42 effectively zero. In addition, if metal bracket 32 and screw 34 are isolated from chassis ground, the same electrical potential can be applied to these elements as to touch pads 24, 26, 28, through conductor 44, thereby making effectively zero the manipulated capacitance 42 due to these elements. Thus, EMCS can be used to adjust the capacitances of touch sensing pads dynamically and optimized the capacitances of the touch sensing pads for desired sensitivity, even where no separate dedicated EMCS elements are used.

The foregoing descriptions present numerous specific details that provide a thorough understanding of various embodiments of the invention. It will be apparent to one skilled in the art that various embodiments, having been disclosed herein, may be practiced without some or all of these specific details. In other instances, components as are known to those of ordinary skill in the art have not been described in detail herein in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention. Accordingly, this application is intended to cover any adaptations or variations of the invention.

What is claimed is:

1. A method of improving the sensing performance of a capacitive touch screen device including at least one capacitive touch pad element disposed on a surface of the capacitive touch screen, the method comprising:
   determining an electrical potential of the at least one capacitive touch pad element for detecting a user touch of the at least one capacitive touch pad element;
   detecting a condition of the capacitive touch screen device that changes usable detectable range of change in capacitance for the at least one capacitive touch pad element;
   selectively altering, based on the determined electrical potential of the at least one capacitive touch pad element and the detected condition, a magnitude of an electrical potential of at least one other electrically conductive structure disposed on the surface of the capacitive touch screen proximate the at least one capacitive touch pad element to alter an effective capacitance of the at least one capacitive touch pad element to thereby improve the usable detectable range of change in capacitance for the at least one capacitive touch pad element; and
   subsequently detecting a user touch of the at least one capacitive touch pad element.

2. The method of claim 1, wherein the electrical potential of the at least one electrically conductive structure is altered to substantially match the electrical potential of the at least one capacitive touch pad element.

3. The method of claim 1, wherein the electrical potential of the at least one electrically conductive structure is altered to a magnitude substantially different from the electrical potential of the at least one capacitive touch pad element.

4. The method of claim 1, further comprising disposing a plurality of electrically conductive elements proximate the at least one capacitive touch pad element.

5. The method of claim 4, wherein an electrical potential of each of the plurality of electrically conductive elements is altered based on the electrical potential of the at least one capacitive touch pad element.

6. The method of claim 1, wherein the capacitive touch screen includes a plurality of capacitive touch pad elements, and wherein a plurality of electrically conductive elements is disposed proximate each capacitive touch pad element of the plurality.

7. The method of claim 1, wherein the at least one electrically conductive element is another capacitive touch pad element disposed proximate the at least one capacitive touch pad element.

8. A capacitance touch sensing device, comprising:
   a plurality of capacitive touch sensing pads disposed on a touch sensitive surface of the capacitance touch sensing device and operatively coupled with a processor for sensing a user touch of the surface of the capacitance touch sensing device;
   at least one electrically conductive element disposed on the surface of the capacitance touch sensing device proximate each one of the plurality of capacitive touch sensing pads; and
   apparatus operative to control application of an electrical potential to a selected capacitive touch sensing pad of the capacitive touch sensing pads and to detect an external condition of the capacitive touch sensing device that changes usable detectable range of change in capacitance for the at least one capacitive touch sensing pad of the plurality of capacitive touch sensing pads, and to selectively alter, based on (i) a magnitude of an electrical potential of the capacitive touch sensing pads and (ii) the detected external condition, a magnitude of an electrical potential of the at least one electrically conductive element to compensate for attenuation of capacitive coupling of the user touch with the surface of the capacitance touch sensing device.

9. The capacitive touch sensing device of claim 8, wherein the detected external condition is the presence of water on the capacitive touch sensing device, and wherein the electrical potential of the electrically conductive elements is altered to substantially match the electrical potential of the capacitive touch sensing pads.

10. The capacitive touch screen device of claim 8, wherein the detected external condition is a user glove intervening between a user's finger and the capacitive touch sensing pads, and wherein the electrical potential of the electrically conductive elements is altered to substantially match the electrical potential of the capacitive touch sensing pads.

11. The capacitive touch screen sensing device of claim 8, wherein the electrically conductive elements are other capacitive touch pads of the plurality of capacitive touch pads.

12. The capacitive touch screen sensing device of claim 8, wherein the electrically conductive elements are conductive structures separate from the capacitive touch pads.

13. The capacitive touch screen sensing device of claim 12, wherein the electrically conductive elements are formed on a same substrate as the capacitive touch pads.

14. A method of compensating for parasitic capacitance in a capacitive touch screen device including at least one capacitive touch pad element, the method comprising:
 applying an electrical potential to a selected capacitive touch pad element of the at least one capacitive touch pad element;
 sensing a change in natural capacitance of the selected capacitive touch pad element due to a user touch of the selected capacitive touch pad element;
 detecting a change in the usable detectable range of change of the natural capacitance of the selected capacitive touch pad element;
 selectively altering, based on the electrical potential applied to the selected capacitive touch pad element, a magnitude of an electrical potential applied to at least one capacitive touch pad element located proximate the selected capacitive touch pad element to compensate for parasitic capacitance of the at least one capacitive touch pad element located proximate the selected capacitive touch pad element; and
 subsequently sensing a change in natural capacitance of the selected capacitive touch pad element due to a user touch of the at least capacitive touch pad element.

15. The method of claim 14, wherein the electrical potential of the at least one electrically conductive structure is altered to substantially match the electrical potential of the at least one capacitive touch pad element.

16. The method of claim 14, wherein the electrical potential of the at least one electrically conductive structure is altered to a magnitude substantially different from the electrical potential of the at least one capacitive touch pad element.

17. The method of claim 14, further comprising disposing a plurality of electrically conductive elements proximate the at least one capacitive touch pad element.

18. The method of claim 17, wherein an electrical potential of each of the plurality of electrically conductive elements is altered based on the electrical potential of the at least one capacitive touch pad element.

19. The method of claim 14, wherein the capacitive touch screen includes a plurality of capacitive touch pad elements, and wherein a plurality of electrically conductive elements is disposed proximate each capacitive touch pad element of the plurality.

20. The method of claim 14, wherein the at least one electrically conductive element is another capacitive touch pad element disposed proximate the at least one capacitive touch pad element.

* * * * *